July 4, 1933.    G. H. MYRICK    1,916,806
WASHING MACHINE
Filed April 20, 1931    2 Sheets-Sheet 1

INVENTOR
GEORGE. H. MYRICK
BY Albert C. Bell
ATTORNEY.

INVENTOR.
GEORGE H. MYRICK.
BY Albert C. Bell
ATTORNEY.

Patented July 4, 1933

1,916,806

UNITED STATES PATENT OFFICE

GEORGE H. MYRICK, OF CHICAGO, ILLINOIS

WASHING MACHINE

Application filed April 20, 1931. Serial No. 531,378.

My invention relates to an improved machine for washing dishes and other articles, by which steam, hot and cold water may be projected into the washing compartment in combined relation and independently as desired to effect different operations desirable in washing dishes and other articles susceptible of being washed in the manner below described.

By my invention I provide an improved mechanism for spraying the water employed, throughout all parts of the container holding the dishes to be washed, and I also provide an improved means for supplying the machine with soap during a washing operation.

Figure 1:
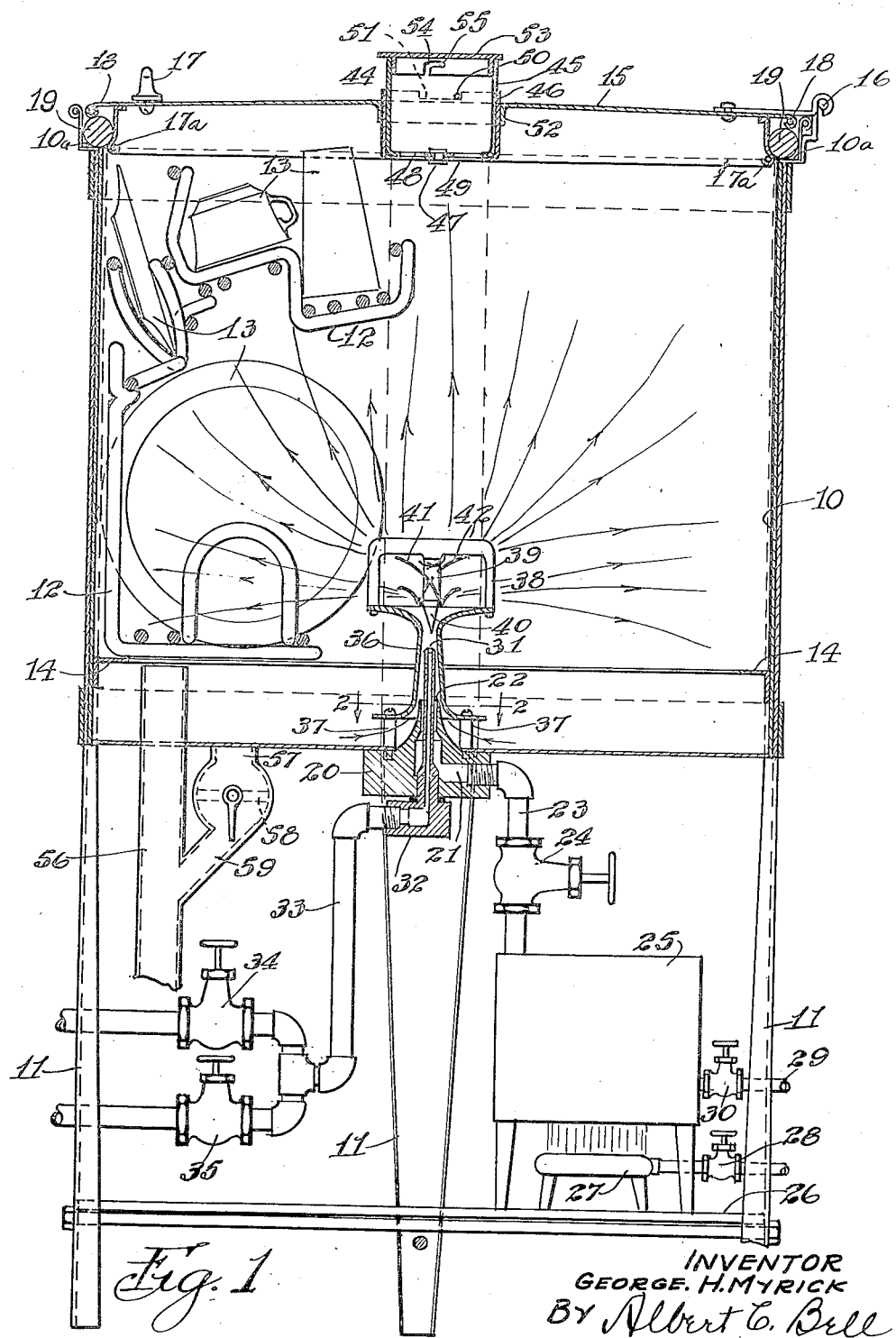
Figure 2:
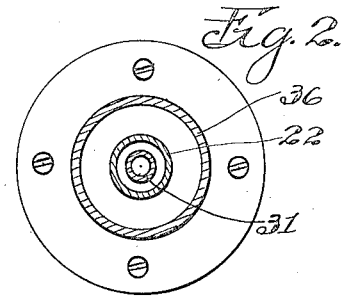
Figure 3:
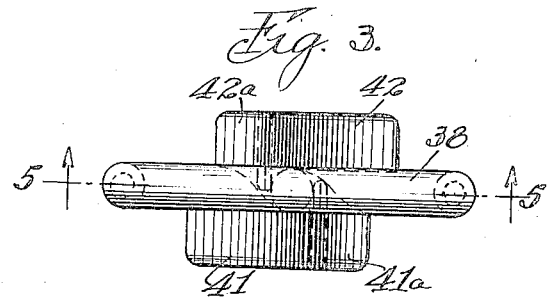
Figure 5:
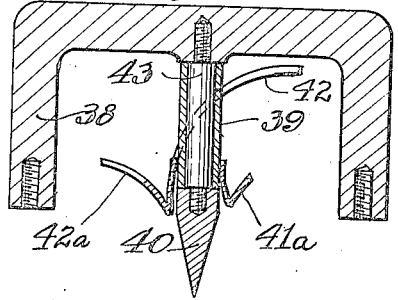
Figure 4:
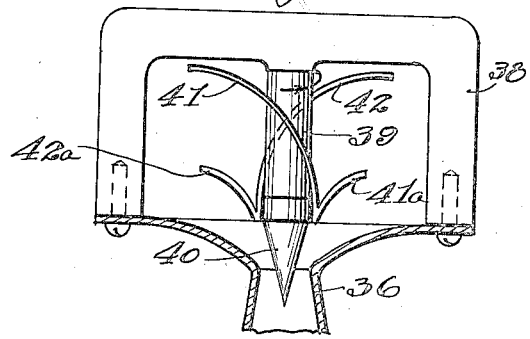
Figure 6:
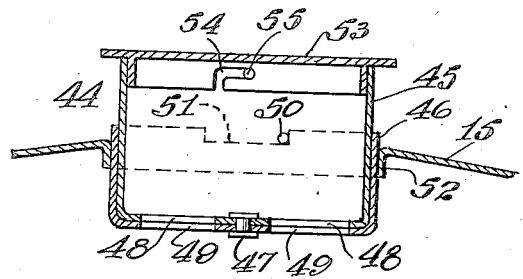
Figure 7:
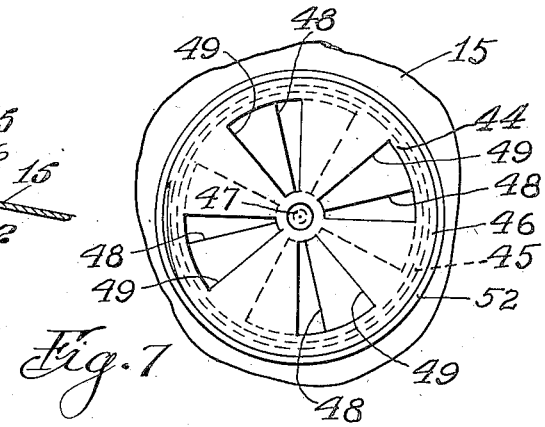

The above and other objects of my invention will best be understood by reference to the accompanying drawings showing a preferred embodiment thereof, in which Fig. 1 is a vertical, central, sectional view through my machine, Fig. 2 is a sectional view to an enlarged scale, of a part of the construction shown in Fig. 1, taken along the line 2—2, Fig. 3 is a top view to an enlarged scale of the spinner employed, and of the bracket for supporting the same, Fig. 4 shows in front elevation, the parts illustrated in Fig. 3, Fig. 5 is a sectional view of the parts shown in Fig. 3 taken along the line 5—5, Fig. 6 shows in a view similar to Fig. 1 and to an enlarged scale, the receptacle forming a part of my machine, which is employed to supply soap to the machine, and Fig. 7 is a bottom view of the soap receptacle shown in Fig. 6.

Similar numerals refer to similar parts throughout the several views.

As shown in Fig. 1, my machine consists of a casing 10 having side and bottom walls and supported at convenient height by legs 11, 11. A rack or racks 12 are located in the machine and may consist of any desired form to hold the dishes or other articles 13, in position to be effectively washed by the water and steam projected into the casing 10, the racks being supported by a flange 14 projecting into the casing from its side wall, just above the water level in the lower part of the casing, while the machine is in use.

The casing 10 is provided with a cover 15 hinged to the casing at 16 and provided with a handle 17 by which the cover may be conveniently moved to its open and closed positions, the cover being preferably provided with beaded edges 17a and 18 holding a packing strip 19 on the cover so that in its closed condition, it is tightly pressed against a portion 10a of the casing. The cover 15 is provided with a receptacle 44 for delivering soap into the casing during a washing operation, as below described.

The central portion of the bottom wall of the casing 10, has mounted therein and extending therethrough, a nozzle block 20 provided with a passageway 21 extending upwardly and forming at its upper end a nozzle 22. The other end of said passageway is threaded for connection with piping 23 connected with a control valve 24, said valve in turn being connected with a steam boiler 25 mounted on a shelf 26 below the casing 10, said shelf being supported by the legs in any convenient manner. The boiler may be heated in any convenient manner, for example by a gas burner 27 supported on the shelf 26, and controlled by a valve 28. Water is supplied to the boiler 25 by a pipe 29 through a control valve 30. As a result of the connections described, steam from the boiler 25 may be supplied to the passageway 21 and discharged through the nozzle 22. The lower portion of the nozzle block 20 is provided with a threaded aperture in line with the nozzle 22 to receive a second nozzle 31 which extends co-axially through the nozzle 22 with a clearance space between said nozzles permitting the free passage of steam from the nozzle 22. The lower end of the nozzle 31 is threaded to tightly engage the threaded aperture in the nozzle block 20 and below its threaded portion, the nozzle is enlarged as shown at 32, to receive a pipe connection 33 extending to valves 34 and 35 which may be connected with hot and cold water under pressure, so that by operation of the valves 34 and 35, either hot or cold water or a mixture of the two, may be supplied to the nozzle 31 and discharged upwardly therefrom.

A tubular directing member 36 is supported co-axially with the nozzle 31 as illustrated in Fig. 2, by posts 37 from the bottom wall of the casing 10, said member preferably converging upwardly and at its open lower end being flared outwardly into a plane parallel with and above the said bottom wall. The upper end of the member 36 is flared outwardly to permit free discharge of steam and water from said member. The member 36 has secured to its upper surface a U-shaped bracket 38 supporting a spinner 39 in line with the nozzle 31 so that the spinner may be rotated rapidly by steam and water projected upwardly from the member 36. The mounting of the spinner 39 carries a fixed tapered member 40 below it, to direct steam and water passing upwardly from the directing member 36, against the vanes 41 and 42 of the spinner.

As more clearly shown in Figs. 3, 4 and 5, the spinner 39 consists of a tubular member carrying the vanes 41 and 42, on its opposite sides and curved upwardly and outwardly in opposite directions, so that said vanes tend to rotate the spinner in the same direction by water and steam projected upwardly against them. The tubular member of the spinner 39 is mounted on a round rod 43 rigidly supported at its upper end by the bracket 38, and having threaded on its lower end, the tapered member 40, so that the said tapered member is stationary and holds the spinner in place on the rod 43. The tubular portion of the spinner is a free fit on the rod 43, so that it may rotate rapidly under the action of water and steam on the vanes 41 and 42. The vanes 41 and 42 are continued from their lower ends, in curved relation as indicated at 41a and 42a, reversely to the curvature of the main portions of said vanes, with the result that water and steam projected upwardly against said portions 41a and 42a, tend to rotate the spinner in a direction opposite to the rotation imparted to the spinner by the action of water and steam projected against the main portions of the vanes 41 and 42. This serves to project the water and steam engaged by the portions 41a and 42a, horizontally and downwardly in the casing 10, while the water and steam engaging the main portions of the vanes 41 and 42, are projected as spray horizontally and upwardly in the casing, with the result that water and steam are sprayed in all directions in the casing by the action of the spinner, and thus all of the articles being washed in the casing, are subjected to the cleaning action of the spray.

As shown in Figs. 6 and 7, the soap receptacle 44 consists of a cylindrical body portion 45 provided with a side and bottom wall, which fits with a sliding fit, in a similar and shallower cylindrical portion 46, these portions being held together by a headed pivot member 47 through their bottom walls. The members 45 and 46 are provided with outlet apertures 48 and 49 for the discharge of soap from the receptacle into the casing 10. The openings 48 and 49 are preferably provided with radial edges, as shown in Fig. 7, and so proportioned that the remaining portions of the bottom walls of the members 45 and 46 will cover and close the said openings when it is desired to retain soap in the receptacle 44. The member 45 is provided with an outwardly projecting pin 50 extending into a notch 51 in the upper edge of the member 46, the edges of the notch 51 serving to limit relative movement of the members 45 and 46. so that for one of the extreme positions of the pin 50 in said notch, the openings 48 and 49 are in alignment with each other for the discharge of soap from the soap receptacle, while for the other extreme position of the pin 50 in said notch 51, said openings 48 and 49 are completely closed. The member 46 is preferably a tight fit in a circular flange 52 extending downwardly from the cover 15, so that the soap receptacle is supported by engagement with said flange 52. The upper end of the tubular member 45 is closed by a flanged cover 53, which may be provided with a slot 54 engaging a pin 55 carried by the member 45, to lock said cover in place on the member 45. This is desirable to prevent the escape of steam through the soap receptacle. It will be observed that the upper edge of the member 46 is somewhat above the cover 15 which places the notch 51 in a position to be readily seen by the operator, so that the open or closed condition of the openings 48 and 49 may readily be determined by the position of the pin 50 in said notch.

In using the soap receptacle, the openings 48 and 49 are closed before a washing operation is begun, the cover 53 is removed, and soap either in powdered or liquid form is placed in the member 45, of sufficient amount to wash the articles contained in the casing 10. The cover 53 is then put in place on the member 45 and the washing operation is proceeded with.

The casing 10 has an overflow drain 56 extending upwardly through it so that its upper end is just below the flange 14, as a result of which during the operation of the machine, water is contained in the lower part of the casing 10 of a depth practically in line with the upper end of the overflow drain 56. A second drain 57 opens from the bottom wall of the casing 10 and communicates through a valve member 58 with a pipe 59 opening into the pipe 56, which latter pipe may extend to any convenient drain or sewer connection.

In using my machine, after the articles to be washed are placed in the casing 10, for example in the racks 12, and after soap is placed in the receptacle 44, cold water is preferably sprayed through the interior of the casing by opening the valve 35, until the articles are wet. Then warm or hot water may be sprayed into and through the casing, by the opening of the valve 34, or of both of the valves 34 and 35, depending upon the temperature of the water supplied to the valve 34; after the articles are heated, the cold water may be shut off entirely and the water supplied through the nozzle 31 may be boiling or nearly so. At about this time, the member 45 of the soap receptacle, is turned to align the openings 48 and 49 and the soap is discharged into the casing. The water sprayed into the casing, is collected in its lower portion to a depth greater than the distance of the lower end of the directing member 36 above the bottom of the casing, as a result of which water is drawn into the member 36 through its open lower end by the suction effect produced at the upper end of the nozzles. Where it is desired to maintain the water in very hot condition and to use steam in connection with the water spray, the valve 24 is opened and steam from the boiler 25 is delivered from the nozzle 22 into the water flowing upwardly in the member 36, and this also produces movement of water upwardly in the member 36 from the lower part of the casing 10. In this manner circulation of the water in the casing is effected and at the same time any particles washed from the articles being cleaned, that are heavier than the water, remain in the bottom part of the casing, and grease and light material removed from the articles flow with the superfluous water into the overflow drain. The soap used with each washing operation is preferably measured carefully to equal that required for the washing operation, and as a result of water being preferably supplied continually to the casing during a washing operation, the excess soap and grease are discharged through the overflow drain at about the time the washing is completed. Following this, hot water is preferably sprayed through the casing, with or without steam as desired, to rinse the washed articles, after which the water supply may be entirely shut off, and steam only may be supplied to the casing, which has the effect of heating the rinsed articles and removing any final bits of foreign matter that may remain on them. The articles are in this way sufficiently heated so that they will dry quickly of their own heat and with clean surfaces, when the steam is turned off. The valve member 58 may be turned to its open position during the rinsing operation so that the rinsing operation will also wash out the machine and leave it ready for the next washing operation.

While I have shown my invention in the particular embodiment above described, it will be understood that I do not limit myself to this exact construction as I may employ equivalents known to the art at the time of the filing of this application without departing from the scope of the appended claims.

What I claim is:

1. In a washing machine, a casing for containing the articles to be washed and having side and bottom walls, a cover for said casing having open and closed positions, a steam nozzle extending upwardly through the bottom wall of said casing, a water nozzle concentric with said steam nozzle and extending through the bottom wall of said casing, a tubular directing member surrounding said nozzles and having an admission opening at its lower end above said bottom wall, a spraying spinner mounted for rotation above the discharge end of said directing member and above and in line with the upper end of said water nozzle, an open water outlet in said casing higher than the admission opening of said directing member, and means for selectively supplying said nozzles with steam and with hot and cold water.

2. In a washing machine, a casing for containing the articles to be washed and having side and bottom walls, a cover for said casing having open and closed positions, a steam nozzle extending upwardly through the bottom wall of said casing, a water nozzle in close proximity to said steam nozzle and extending through the bottom wall of said casing, a tubular directing member surrounding said nozzles and having an admission opening at its lower end above said bottom wall, a spraying spinner mounted for rotation above the discharge end of said directing member and above and in line with the upper end of said water nozzle, and an open water outlet in said casing higher than the admission opening in said directing member.

3. In a washing machine, the combination of a casing having a bottom wall, concentric steam and water nozzles extending upwardly through said bottom wall, a spraying spinner in the path of flow from said water nozzle, and a tubular suction member around said nozzles and having its open lower end spaced from said bottom wall.

4. In a washing machine, the combination of a casing having a bottom wall, closely related steam and water nozzles extending upwardly through said bottom wall, a spraying spinner in the path of flow from said water nozzle, and a tubular suction member around said nozzles and having its open lower end spaced from said bottom wall.

In witness whereof, I hereunto subscribe my name this 10th day of April, A. D. 1931.

GEORGE H. MYRICK.